May 16, 1950 V. SAGER 2,507,818
OIL FILTER
Filed Aug. 6, 1949
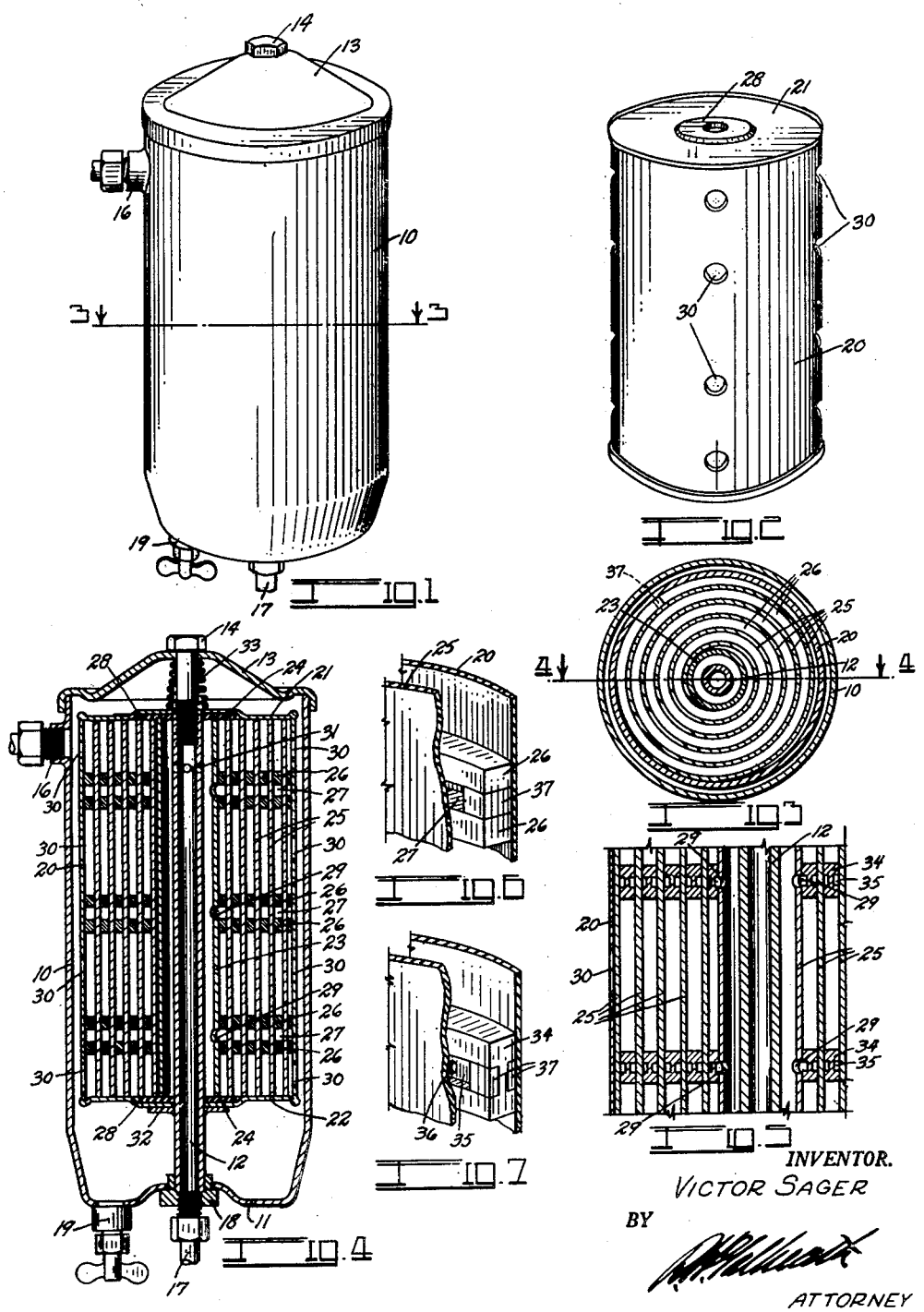
INVENTOR.
VICTOR SAGER
BY
ATTORNEY Patented May 16, 1950

2,507,818

UNITED STATES PATENT OFFICE 2,507,818

OIL FILTER

Victor Sager, Craig, Colo.

Application August 6, 1949, Serial No. 108,990

6 Claims. (Cl. 210—183)

This invention relates to an oil filter, and while more particularly designed for use on automobiles and other automotive vehicles, it is, of course, not limited to this particular field of use.

The principal object of the invention is to provide an oil filter construction which will be more efficient in removing impurities from the oil than the present devices; which will have a relatively large capacity for impurities, so as to require less frequent renewal; and which will efficiently remove liquid dilutents such as gasoline, water, etc., from the oil.

Another object of the invention is to provide an inexpensive, self-contained, filtering core or cartridge for oil filters which can be quickly and easily removed and replaced in the filter.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawings and throughout the description.

In the drawing:

Fig. 1 is a perspective view of any automotive type of the improved oil filter;

Fig. 2 is a similar view of the filtering core or cartridge employed in the improved filter;

Fig. 3 is a cross-section through the filter, taken on the line 3—3, Fig. 1;

Fig. 4 is a vertical section therethrough, taken on the line 4—4, Fig. 3;

Fig. 5 is an enlarged, fragmentary, vertical section, illustrating an alternate form of construction for the improved filter;

Fig. 6 is an enlarged, detail, perspective view, showing the outer extremity of a separator strip employed in the invention; and Fig. 7 is a similar view illustrating the outer extremity of an alternate form of separator strip.

The improved filter consists of a cup-shaped, cylindrical housing 10 having a normally open top and a closed bottom 11. A riser tube 12 rises from the axis of the bottom 11 within the housing 10 to a position substantially in alignment with the upper edge of the latter. The top of the housing 10 is closed by means of a removable cap 13, which is clamped in place thereon by means of a suitable clamp screw 14. The screw 14 is threaded into the top of the riser tube 12 and acts to close the latter. A removable drain plug 19 is positioned in the bottom 11 of the housing 10 for draining the latter.

The oil to be filtered enters the housing 10 through a feed pipe 15 connected into a feed nipple 16 on the side of the housing 10. The filtered oil discharges through a discharge pipe 17 connected into a discharge nipple 18 on the bottom 11 in communication with the interior of the riser tube 12.

The filtering element of the filter comprises a cylindrical, can-like container or cartridge 20 closed at its top and bottom by means of top and bottom plates 21 and 22, respectively. A core tube 23 extends coaxially throughout the length of the cartridge 20 and is sealed at its extremities against the top and bottom plates 21 and 22 by means of suitable sealing gaskets 24, which rest in indentations 28 in the plates 21 and 22.

An elongated sheet of filter paper or similar flexible fibrous material, separated by separator strips 26, is wound about the core tube 23 in a complete, tight, helical wind. The convolutions of the paper in the helical wind are maintained uniformly separated by means of the separator strips 26. The latter are formed of rubber, plastic, pressed paper, or other suitable flexible impervious material.

The separator strips 26 are positioned in adjacent pairs. In the embodiment illustrated, three pairs of separator strips 26 are used, the strips of each pair forming the side walls of an intermediate oil channel 27 extending throughout the entire length of the strips. The inner extremities of the separator strips 26 taper down to a feather edge to allow the inner edge of the innermost convolution of the paper 25 to lie against the core tube 23 so as to seal off the ends of the oil channels 27.

The core tube 23 is perforated, as indicated at 29, the perforations 29 being positioned in vertical alignment with the positions of the oil channels 27. The outer wall of the cartridge 20 is perforated, as indicated at 30, at elevations intermediate the pairs of separator strips 26. The riser tube 12 is perforated, as shown at 31, adjacent its upper extremity.

The cartridge 20 is supported within the housing 10 upon a suitable supporting flange 32 formed on and surrounding the riser tube 12 adjacent the bottom thereof. The cartridge is held against the flange 32 by means of a compression spring 33 which surrounds the clamp screw 14. The pressure produced by the spring 33 acts to compress the gaskets 24 between the ends of the core tube 23 and the end plates 21 and 22 so as to seal the former.

In use, the oil flows from the pipe 15 into the housing 10 and completely fills the latter. The oil then flows through the perforations 30 in the cartridge 20 and follows the convoluted spaces between the pairs of spacer strips 26 so as to completely fill the filter element. The oil then travels by capillary attraction through the interstices between the spacer strips 26 and the paper sheets 25 into the oil channels 27. It then flows along these grooves in spirals to their innermost extremities, and discharges through the perforations 29 into the core tube 23. From thence the oil rises and flows through the perforations 31 into the riser tube 12 and discharges through the nipple 18 into the discharge pipe 17.

It is desired to call attention to the fact that the paper sheet 25 does not serve as a filter in the usual sense, that is, the oil does not pass through the paper, since the impure oil is under uniform pressure on both sides of the paper throughout its entire area. The filtering is accomplished in the capillary movement of the oil through the small, tortuous spaces between the surfaces of the paper and the contacting surfaces of the spacing strips 26. The paper sheet, however, does provide a relatively great surface area to which impurities, such as sludge, carbon, metal particles, etc., will adhere by an adsorption effect, and the paper acts to absorb water, gasoline, and other non-oily foreign fluids.

The heavier impurities settle immediately into the bottom of the housing 10. The remaining impurities collect on the walls of the helical chambers between the paper windings and along the spiral joining crack between the spacing strips and the paper. A final settling is provided in the core tube 23 by positioning the perforations 31 at the top thereof, which will settle out any remaining water and other low-gravity fluids which might enter between the paper and the spacing strips. High-gravity fluids, such as gasoline and the like, will be absorbed in the paper sheet so that an oil of high purity is discharged from the riser tube 12.

The entire filtering element or cartridge can be lifted from the housing 10 or dropped in place therein by simply removing the cap 13.

While the device has been illustrated and described as having pairs of spacer strips outlining an oil channel, the same result could be accomplished by employing single spacer strips 34, as shown in Fig. 5, each strip being provided with longitudinally extending oil grooves 35 in its opposite sides. The grooves 35 collect the oil and accomplish the same result as the oil channel 27 previously described. The grooves convey the oil to the perforations 31 in the riser tube 12. In this form it is preferred to perforate the strips 34, as shown at 36, to allow the oil to flow from the groove in one face to the groove in the other face.

In order to prevent the contaminated oil from flowing from the cartridge into the ends of the channels 27 of the first form, and the grooves 35 of the strips 34 of the second form, the outer extremities of both channels and grooves are closed by means of plugs or dams, as shown at 37 in Fig. 6.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. An oil filter comprising: a housing; a riser tube in said housing; a cartridge in said housing; an axially positioned core tube extending through said cartridge about said riser tube; a sheet of fibrous material extending in a helix from said core tube to the inner wall of said cartridge; separating strips extending lengthwise of said sheet between the adjacent convolutions of said helix and acting to maintain said convolutions uniformly separated to provide intervening space therebetween, said strips dividing said space into alternating, unfiltered oil chambers and filtered oil passages said cartridge having openings communicating between said unfiltered oil chambers and said housing; means for carrying filtered oil from said passage to said riser tube; means for supplying unfiltered oil to said housing; and means for removing filtered oil from said core tube.

2. An oil filter comprising: a housing; a riser tube in said housing; a cartridge in said housing; an axially positioned core tube extending through said cartridge about said riser tube; a sheet of fibrous material extending in a helix from said core tube to the inner wall of said cartridge; separating strips extending lengthwise of said sheet between the adjacent convolutions of said helix and acting to maintain said convolutions uniformly separated to provide intervening space therebetween, said strips dividing said space into alternating, unfiltered oil chambers and filtered oil passages, said passages opening to said core tube through perforations therein, said chambers opening to the interior of said housing through openings in the wall of said cartridge to allow unfiltered oil to enter said chambers and pass between said separating strips and said fibrous material into said passages; means for supplying unfiltered oil to said housing; and means for removing filtered oil from said riser tube.

3. An oil filter comprising: a housing; a riser tube in said housing; a cartridge in said housing; an axially positioned core tube extending through said cartridge about said riser tube; a sheet of fibrous material extending in a helix from said core tube to the inner wall of said cartridge; separating strips extending lengthwise of said sheet between the adjacent convolutions of said helix and acting to maintain said convolutions uniformly separated to provide intervening space therebetween, each of said separating strips confining an oil passage separated from the remainder of said intervening space; means for feeding unfiltered oil to said space from said housing so that it will flow between said strips and said sheet into said oil passages; and means for transferring oil from said passages to said riser tube.

4. An oil filter for filtering oil comprising: two spaced-apart, parallel walls of fibrous material; spacing members positioned between and in contact with said walls and dividing the intervening space into adjacent, unfiltered oil chambers and filtered oil passages, said walls and said spacing members being wound in a helix; a core tube extending through said helix; and a cartridge surrounding said helix, and provided with openings communicating with said oil chambers to cause oil to enter the latter and flow between said walls and said spacing members into said passages, said core tube being provided with openings communicating with said passages to allow oil to discharge from said passages; a housing surrounding said cartridge; a riser tube in said core tube; means for supplying unfiltered oil to said housing; and means for discharging filtered oil from said riser tube.

5. An oil filter for filtering oil comprising: two spaced-apart, parallel walls of fibrous material; spacing members positioned between and in contact with said walls and dividing the intervening space into adjacent, unfiltered oil chambers and filtered oil passages, said walls and said spacing members being wound in a helix; a core tube extending through said helix; a cartridge surrounding said helix, and provided with openings communicating with said oil chambers to cause oil to enter the latter and flow between said walls and said spacing members into said passages, said core tube being provided with openings communicating with said passages to allow oil to discharge from said passages; a closed housing surrounding said closed container; a riser tube in said housing extending into said core tube to withdraw oil therefrom; and means for supplying oil to said housing.

6. An oil filter comprising: a vertical cylindrical housing; an axially positioned riser tube communicating through the bottom of said housing and extending upwardly therein, and provided with oil ports; a core tube surrounding said riser tube; a sheet of flexible material wound in a helix about said core tube; spaced-apart separating members following the helix of said flexible material and maintaining the convolutions thereof uniformly spaced apart; a cylindrical cartridge surrounding said helix, said cartridge being perforated intermediate said spacer strips; an oil-conducting channel in each spacer strip, said core tube being perforated to provide communication with said latter channel; means for introducing oil into said housing; and means for discharging oil from said riser tube.

VICTOR SAGER.

REFERENCES CITED

The following references are of record in the file of this patent:

UNITED STATES PATENTS

| Number | Name | Date |
| --- | --- | --- |
| 1,720,384 | Smith | July 9, 1929 |
| 1,723,053 | McKinley | Aug. 6, 1929 |
| 1,746,222 | McKinley | Feb. 4, 1930 |
| 2,173,978 | Pennebaker | Sept. 26, 1939 |
| 2,209,180 | Von Pentz | July 23, 1940 |
| 2,253,684 | Burckhalter | Aug. 26, 1941 |
| 2,375,345 | Burhans | May 8, 1945 |
| 2,387,714 | Briggs | Oct. 30, 1945 |